(12) United States Patent
Englar et al.

(10) Patent No.: US 7,104,498 B2
(45) Date of Patent: Sep. 12, 2006

(54) CHANNEL-WING SYSTEM FOR THRUST DEFLECTION AND FORCE/MOMENT GENERATION

(75) Inventors: Robert J. Englar, Marietta, GA (US); Dennis M. Bushnell, Hayes, VA (US)

(73) Assignee: Georgia Tech Research Corp., Atlanta, GA (US)

( * ) Notice: Subject to any disclaimer, the term of this patent is extended or adjusted under 35 U.S.C. 154(b) by 111 days.

(21) Appl. No.: 10/867,114

(22) Filed: Jun. 14, 2004

(65) Prior Publication Data

US 2005/0029396 A1     Feb. 10, 2005

Related U.S. Application Data

(60) Provisional application No. 60/478,186, filed on Jun. 13, 2003.

(51) Int. Cl.
*B64C 15/00* (2006.01)
(52) U.S. Cl. ...................... 244/12.6; 244/207
(58) Field of Classification Search .............. 244/12.6, 244/207
See application file for complete search history.

(56) References Cited

U.S. PATENT DOCUMENTS

| | | | |
|---|---|---|---|
| 2,424,556 A | | 7/1947 | Custer |
| 2,476,482 A | | 7/1949 | Custer |
| 2,510,959 A | * | 6/1950 | Custer .................. 244/12.6 |
| 2,514,478 A | * | 7/1950 | Custer .................. 244/12.6 |
| 2,532,481 A | | 12/1950 | Custer |
| 2,532,482 A | * | 12/1950 | Custer .................. 244/12.6 |
| 2,589,994 A | | 3/1952 | Custer |
| 2,611,555 A | * | 9/1952 | Custer .................. 244/12.6 |
| 2,611,556 A | | 9/1952 | Custer |
| 2,665,083 A | * | 1/1954 | Custer .................. 244/12.6 |
| 2,687,262 A | | 8/1954 | Custer |
| 2,691,494 A | * | 10/1954 | Custer .................. 244/12.6 |
| 2,885,160 A | * | 5/1959 | Griswold, II ............ 244/207 |
| 2,937,823 A | * | 5/1960 | Fletcher ................. 244/12.6 |

(Continued)

*Primary Examiner*—Peter M. Poon
*Assistant Examiner*—Jia Qi (Josh) Zhou
(74) *Attorney, Agent, or Firm*—Thomas, Kayden, Horstemeyer & Risley, LLP

(57) ABSTRACT

An aircraft comprising a Channel Wing having blown channel circulation control wings (CCW) for various functions. The blown channel CCW includes a channel that has a rounded or near-round trailing edge. The channel further has a trailing-edge slot that is adjacent to the rounded trailing edge of the channel. The trailing-edge slot has an inlet connected to a source of pressurized air and is capable of tangentially discharging pressurized air over the rounded trailing edge. The aircraft further has a propeller that is located in the channel and ahead of the rounded trailing edge of the channel. The propeller provides a propeller thrust exhaust stream across the channel wing to propel the aircraft through the air and to provide high lift. The pressurized air being discharged over the rounded trailing edge provides a high lift that is obtained independent of an aircraft angle of attack, thus preventing the asymmetry, separated flow, and stall experienced by the CC wing at the high angle of attack it required for high lift generation. The aircraft can further include blown outboard circulation control wings (CCW) that are synergistically connected to the blown channel CCWs. The blown outboard CCWs provide additional high lift, control thrust/drag interchange, and can provide all three aerodynamic moments when differential blowing is applied front-to-rear or left-to-right. Both the blown channel CCW and the outboard CCW also have leading-edge blowing slots to prevent flow separation or to provide aerodynamic moments for control.

18 Claims, 3 Drawing Sheets

U.S. PATENT DOCUMENTS

| | | | |
|---|---|---|---|
| 2,957,647 A * | 10/1960 | Shew | 244/12.6 |
| 3,081,965 A * | 3/1963 | Shew | 244/12.6 |
| 3,123,321 A | 3/1964 | Custer | |
| 3,204,596 A | 9/1965 | Fallon | |
| 3,504,873 A | 4/1970 | Spence | |
| 3,704,842 A * | 12/1972 | Custer | 244/12.6 |
| 3,705,700 A * | 12/1972 | Custer | 244/13 |
| 3,830,450 A | 8/1974 | Williams et al. | 244/42 |
| 4,307,856 A | 12/1981 | Walker | 244/12.2 |
| 4,387,869 A | 6/1983 | Englar | 244/207 |
| 4,391,424 A * | 7/1983 | Bartoe, Jr. | 244/207 |
| 4,398,687 A | 8/1983 | Nichols, Jr. et al. | 244/207 |
| 4,415,131 A | 11/1983 | Bertelsen et al. | 244/13 |
| 4,463,920 A | 8/1984 | Nichols, Jr. et al. | 244/207 |
| 5,082,204 A | 1/1992 | Croston | 244/126 |
| 5,597,137 A | 1/1997 | Skoglun | 244/12.4 |
| 6,155,893 A | 12/2000 | Belmont | 440/66 |
| 6,474,604 B1 | 11/2002 | Carlow | 244/199 |
| 6,592,072 B1 | 7/2003 | Gregg, III et al. | 244/35 |
| 6,708,924 B1 | 3/2004 | Page et al. | 244/36 |
| 2003/0062443 A1 | 4/2003 | Wagner et al. | 244/12.3 |
| 2003/0085319 A1 | 5/2003 | Wagner et al. | 244/12.3 |

* cited by examiner

CHANNEL-WING SYSTEM FOR THRUST DEFLECTION AND FORCE/MOMENT GENERATION

CROSS-REFERENCE TO RELATED APPLICATION

This application claims priority to copending U.S. provisional application entitled, "Blown Channel-Wing System For Thrust Deflection And Aerodynamic Force/Moment Generation," having Ser. No. 60/478,186, filed on Jun. 13, 2003, which is entirely incorporated herein by reference.

ORIGIN OF INVENTION

The invention described herein was made in the performance of work under a NASA contract and by an employee of the United States Government and is subject to the provisions of Public Law 96-517 (35 U.S.C. 202) and may be manufactured and used by or for the Government for governmental purposes without the payment of any royalties thereon or therefore. In accordance with 35 U.S.C. 202, the contractor elected to retain title.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of Grant No. NAG-1-02075 awarded by the Langley Research Center of the National Aeronautics and Space Administration of the U.S.

TECHNICAL FIELD

The present invention is generally related to aerodynamic force and moment generation systems, and, more particularly, is related to wings of a powered-lift aircraft with each wing including a channel, a rounded trailing edge, a propeller installed in the channel to provide thrust and powered lift to the aircraft, and a slot or slots adjacent the rounded trailing edge of the wings that discharge pressurized air over the rounded trailing edge.

BACKGROUND

The ability to achieve Super-Short Takeoff and Landing (Super STOL) or Vertical/Short Takeoff and Landing (VSTOL) capability with fixed-wing aircraft has long been an attractive goal in the aerospace community. There are numerous benefits associated with very-short to zero-field-length operations of non-rotary-wing aircraft such as the development of a simple/reliable/effective personal and business-sized Super-STOL or VSTOL aircraft operating from remote or small sites as well as increasingly dense urban environments, or a military transport operating from small sites.

A Channel Wing (ChW) powered-lift aircraft provides some characteristics of Super STOL or VSTOL. Through use of the propeller slipstream, the Channel Wing developed by Willard Custer was able to achieve significant lift coefficient and efficient downward thrust deflection without varying the high-lift configuration geometry. The ChW aircraft places the propeller at the very trailing edge of the 180-degree arc circular channel in the wing. This location of the propeller and the propeller's inflow field increase the velocity over the channel's upper surface and augment the circulation and lift there in much the same manner as a moveable mechanical flap. Lift is also augmented by the deflected thrust slipstream behind the channel. However, the thrust deflection on this ChW aircraft itself was very limited until the channel was tilted to very high angle of attack, and this severely limited a pilot's visibility. This also caused severe flow separations and asymmetries, and flight control became very difficult if at all possible at these conditions.

The Ch W aircraft has a number of drawbacks associated with low-speed handling, cruise drag, stability & control, high-incidence operation, and one-engine-out scenarios, including, but not limited to:

higher drag from the channel surface area, asymmetric thrust yields asymmetric moments and instability, channel leading-edge and trailing-edge separation occurring at high angle of attack, poor low-speed control from conventional aerodynamic surfaces operating at low dynamic pressures, nose-down pitch from aft propeller loading on the wing, non-uniform flow around the propeller at high angle of attack, poor lift/drag ratio in cruise and climbing flight, high-angle-of-attack operation could cause poor visibility and control, and one-engine-out control problems.

Another way to achieve Super STOL or VSTOL is to implement an outboard Circulation Control Wing/Upper Surface Blowing (CCW/USB) system that has high jet-induced thrust deflection. Typically, this CCW/USB system includes an engine and exhaust nozzle over the wing which squashes a circular jet thrust into a flattened exhaust stream. The CCW/USB system further includes a flat wing that has a trailing-edge slot and a rounded trailing edge. The trailing-edge slot is placed adjacent and along the rounded trailing edge. The trailing-edge slot discharges pressurized air over the rounded trailing edge. The pressurized air that is discharged over the rounded trailing edge remains attached to the rounded trailing edge by balancing reduced static pressure with centrifugal force of a curving jet. The pressurized air produces negative pressure (suction) along the rounded trailing edge. When the flattened thrust stream passes over the upper surface of the rounded trailing edge, it is entrained into the pressurized air and is deflected, which provides a thrust deflection (and even a thrust reversal) and the associated high lift.

A related concept employing the Circulation Control Wing (CCW) alone was also developed earlier than the CCW/USB system. This CCW is typically a flat wing that employs a slot blowing tangentially over a rounded or near-round trailing edge similar to the CCW/USB system, but without the engine and exhaust nozzle located on the wing's upper surface. This CCW alone uses jet turning to entrain the wing's flow field and augment its circulation lift. It also can employ a leading-edge slot blowing to keep the wing leading edge flow field from separating and also to control the airfoil/wing pitching moment.

From the above, it can be appreciated that it would be desirable to have an improved Channel Wing aircraft that eliminates many of the asymmetry, aircraft control, efficiency (lift/drag ratio), and flow separation problems which were found to be inherent in the original Channel Wing configuration, particularly taking advantage of the Circulation Control (CC) Wing and CCW/USB system technology.

Also, a means to control all the aerodynamic moments for this aircraft operating at very low flight speeds is quite desirable.

SUMMARY

Embodiments of the present invention provide a pneumatic (blown) powered-lift aircraft that has a very high augmentation of propulsive and aerodynamic forces allowing very low flight speed and very short takeoff/landing distances and the capability to control moments allowing flight control at these very low speeds (normally a serious problem for Super STOL an VTOL aircraft). Because of controllability and quick response times, safety of flight is greatly enhanced. Also, the ability to interchange thrust (needed for takeoff and climb) and drag (needed for STOL approach) is provided without moving parts. Because of the Super STOL or VTOL capabilities, an aircraft can use small runways or landing pads. Also, the location of the propeller in this aircraft ahead of the channel trailing edge and behind its leading edge substantially eliminates propeller noise perception on the ground and substantially shields passengers on the ground from propeller contact.

Briefly described, one embodiment of the aircraft, among others, can be implemented as follows. An aircraft comprises a Channel Wing (ChW) having a blown channel circulation control wing. The blown channel CCW includes a channel that has a rounded or near-round trailing edge, rather than the sharp trailing edge found on a conventional ChW aircraft's channel. The channel further has a trailing-edge slot that is adjacent to the rounded trailing edge of the channel. The trailing-edge slot has an inlet connected to a source of pressurized air and is capable of tangentially discharging pressurized air over the rounded trailing edge. Based on the now-well-known Coanda effect, the jet stays attached to the rounded trailing edge and strongly entrains the surrounding flow field.

The aircraft further has a propeller that is located aft in the channel ahead of the rounded trailing edge of the channel, but not at the trailing edge as it is for a conventional ChW aircraft. This propeller location forward of the trailing edge of the channel but aft of the leading edge of the channel also substantially provides noise shielding of the propeller relative to the ground and substantially prevents possible contact with passengers when on the ground. The propeller provides a propeller thrust stream across the channel wing's upper surface to propel the aircraft through the air. The pressurized air being discharged over the rounded trailing edge of the channel entrains and deflects the propeller slipstream. This provides a high lift (from both thrust deflection and circulation augmentation) that is obtained independent of aircraft angle of attack, thus preventing the asymmetry, separated flow, and stall experienced by the convention Channel Wing at the high angle of attack it requires for high lift generation. This pneumatic powered-lift aircraft also employs an outboard wing section employing Circulation Control Wing (CCW) where blowing alone further augments lift and also can increase drag for SuperSTOL landing or can decrease drag for SuperSTOL takeoff and climb. The aircraft has the capabilities to have differential blowing (left-to-right, or right-to-left wing) from the trailing-edge slot that provides rolling and yawing control moments.

Other systems, features, and advantages of the present invention will be or become apparent to one with skill in the art upon examination of the following drawings and detailed description. It is intended that all such additional systems, features, and advantages be included within this description, be within the scope of the present invention, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Disclosed herein are apparatuses that include a channel circulation control wing system incorporated into a Channel Wing (ChW) configuration. The apparatus is one of a combined, integrated Pneumatic (blown) Channel Wing VTOL and Super Short Takeoff and Landing (Super STOL) aircraft, varying all aerodynamic and powered lift characteristics merely by varying air pressure or air flow, without any external moving parts. Further, because of its aerodynamic and powered-lift characteristics, the aircraft eliminates many of the asymmetry, aircraft control and flow separation problems which were found to be inherent in the original channel wing configuration. The aircraft combines an unblown channel wing, a blown channel wing circulation control wing (CCW), and a blown outboard CCW to give far greater lift and control then any of the individual wing elements and is controlled by blowing air without any moving parts other than the propeller in the channel.

Figure 1:
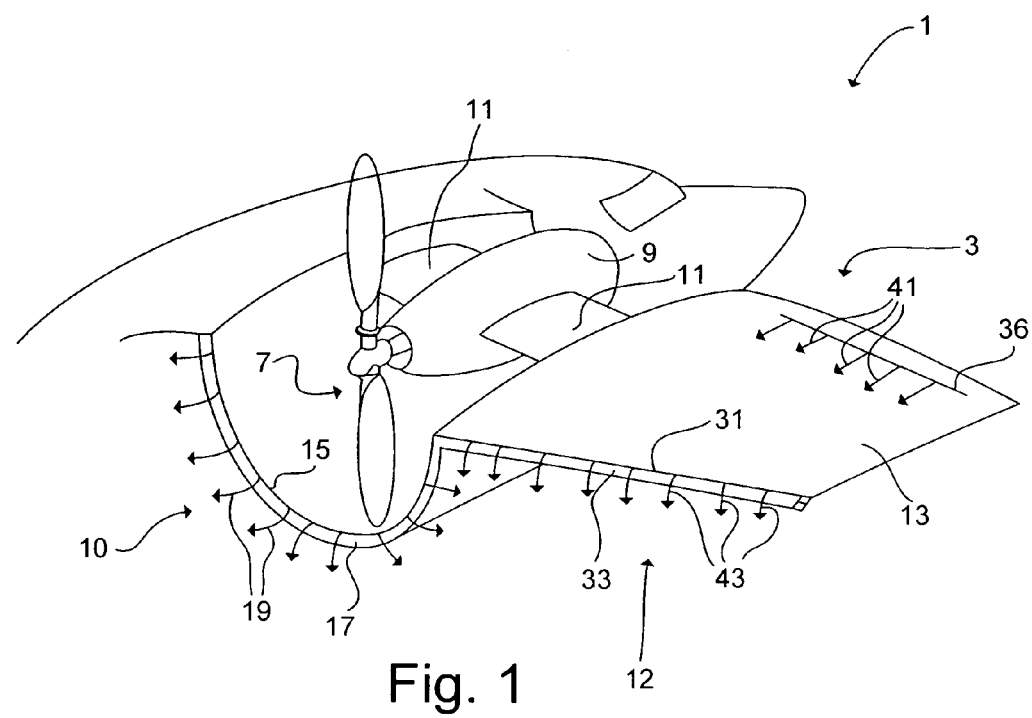
FIG. 1 illustrates a perspective view of an embodiment of an aircraft having a Channel Wing that includes a blown channel Circulation Control Wing and a blown outboard Circulation Control Wing.

Referring now in more detail to the figures in which like reference numerals identify corresponding parts, FIG. 1 illustrates a perspective view of an embodiment of an aircraft that includes a Channel Wing (ChW) having a blown channel Circulation Control Wing and a blown outboard Circulation Control Wing. The aircraft 1 includes a Channel Wing 3 that has a channel 5 and an outboard wing 13. The Channel Wing 3 further includes an engine 9 that can be connected with struts 11 to the inside of the 180-degree arc of the channel 5 of the wing 3. The engine 9 is further connected with and drives the propeller 7, which is preferably located in the channel 5 of the wing 3. The channel 5 includes a trailing-edge slot(s) 15 that discharges pressurized air 19 and a trailing edge 17 that is substantially rounded. The channel 5 further includes a leading-edge slot(s) (not shown) that discharges pressurized air (not shown). The channel section of the wing 3 can be referred as a blown channel Circulation Control Wing (CCW) 10, which is described in relation to FIGS. 2 and 3.

The outboard wing 13 includes a leading-edge slot(s) 36, a trailing-edge slot(s) 31, and a rounded or near-rounded trailing edge 33. The leading-edge slot 36 and the trailing-edge slot 31 discharge pressurized air 41, 43. The outboard section of the wing 3 can be referred as a blown outboard Circulation Control Wing (CCW) 12, which is described in relation to FIGS. 4 and 5.

Figure 2:
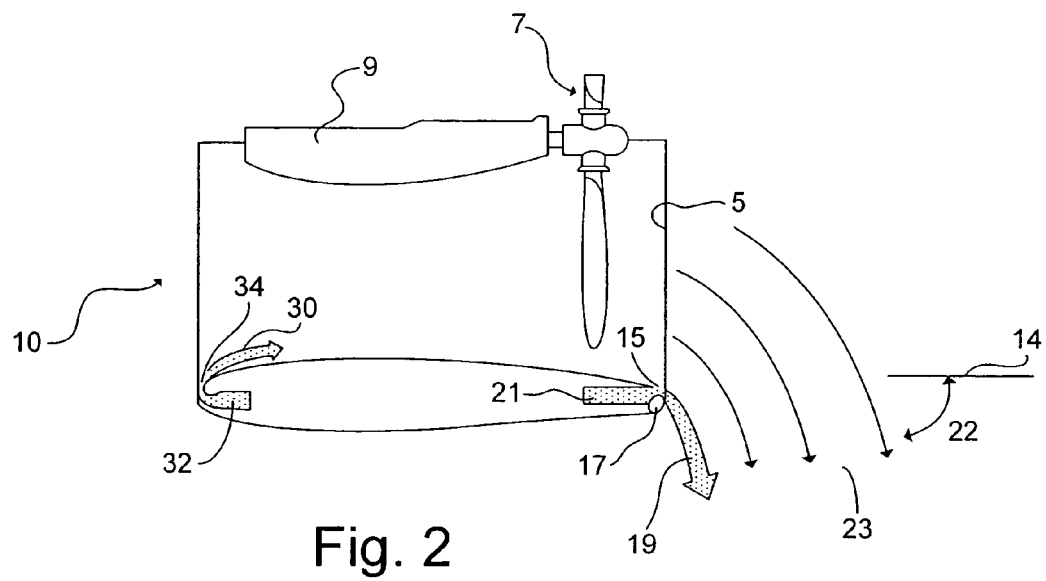
FIG. 2 is a fragmentary section view of an embodiment of the blown channel Circulation Control Wing shown in FIG. 1 having a thrust deflection downstream of the trailing edge.

FIG. 2 is a fragmentary section view of an embodiment of the blown channel Circulation Control Wing (CCW) shown in FIG. 1 having a thrust deflection and thus powered-lift capability. The blown channel CCW 10 includes a channel 5. The blown channel CCW 10 includes an air supply plenum 21, a trailing-edge slot 15 and a trailing edge 17 that is substantially rounded. The trailing edge slot 15 is located adjacent to and tangential along the rounded trailing edge 17. This trailing edge does not have to be round, but can be an arc with turning angles between say 0° and 180°. The air supply plenum 21 is connected to an inlet (not shown) connected to an air source (not shown) that discharges pressurized air 19 through the trailing edge slot 15 issuing a circulation control jet sheet 19 at a blowing rate over the rounded trailing edge 17.

The pressurized air 19 that is discharged over the rounded trailing edge 17 remains attached to the rounded trailing edge 17 of the channel 5 by balancing reduced static pressure with centrifugal force. The pressurized air 19 produces negative pressure (suction) along the rounded trailing edge 17. When the propeller thrust 23 passes over the upper surface of the channel 5 and its rounded trailing edge 17, the propeller thrust 23 is entrained by and into the pressurized air 19 and is deflected 23 at an angle 22 greater than 0 degrees and up to approximately 85° degrees from a horizontal plane 14, which augments lift generated in the channel 5. The deflected thrust 23 provides high lift that is obtained independent of an aircraft angle of attack, thus preventing the asymmetry, separated flow, and stall experienced by the conventional Channel Wing at the high angle of attack it previously required for short landing capability. The high lift is a much higher magnitude than just vectored thrust, thus allowing SuperSTOL at low angle of attack, due to entrainment by the blown channel of the nearly round propeller exhaust stream.

The blown channel CCW 10 further includes an air supply plenum 32 and leading-edge slot(s) 34. The air supply plenum 32 is connected to an inlet (not shown) connected to an air source (not shown) that discharges pressurized air 30 tangentially at the leading-edge slot 34 of the blown channel CCW 10. This control the leading-edge flow separation so as to facilitate eliminating leading-edge stall of the channel 5, flow asymmetry into the propeller 7 and the resulting instability. The leading-edge slot 34 can discharge pressurized air at various blowing rate, which the air remains attached to the top surface of the blown channel CCW 10 flowing from the leading edge to the trailing edge of the blown channel CCW 10, and can further remain attached to the rounded trailing edge 17 that provides more lift.

The propeller 7 is preferably located in and operated in the channel 5 and its 180-degree arc. The propeller 7 is located ahead of the rounded trailing edge 17 and aft of a leading edge of the blown channel CCW 10. The propeller provides a propeller thrust 23 and an increased inflow velocity in a near-circular propeller exhaust stream across the channel 5. The propeller 7 is preferably placed about 60% to 70% of the chord distance from the front or 30–40% from the back in the channel 5, but this distance can vary. The location of the propeller relative to the curved upper surface of the channel enables the propeller to augment the air velocity over that surface. Unlike the conventional Channel Wing with its propeller at the channel trailing edge, this propeller location within the channel also substantially shields propeller noise from reaching the ground, and substantially protects passengers from contact with the propeller during loading or unloading on the ground.

Figure 3:
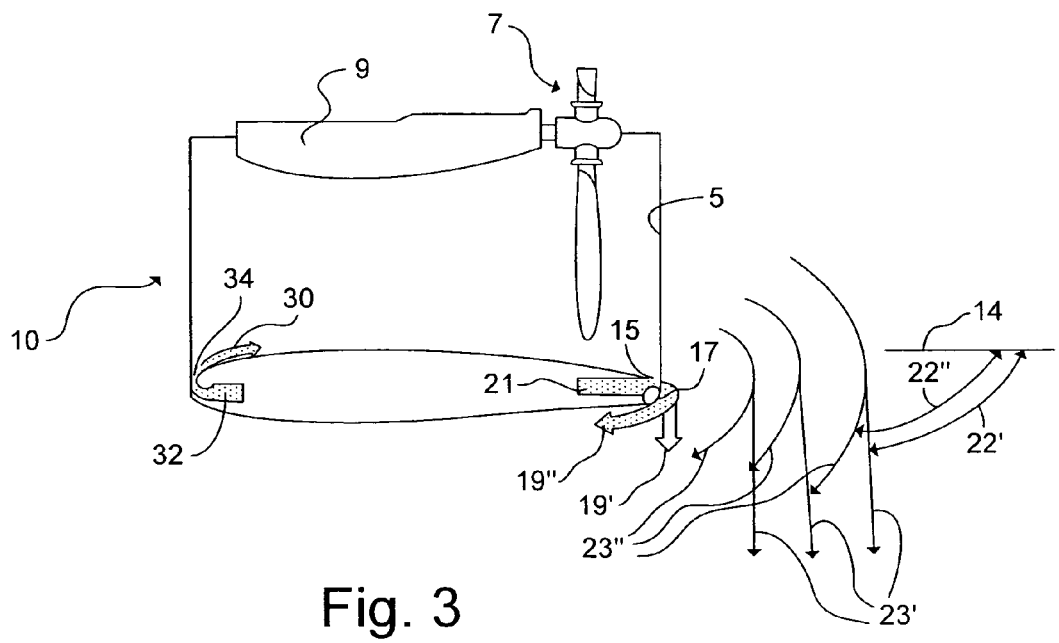
FIG. 3 is a fragmentary section view of an embodiment of the blown channel Circulation Control Wing shown in FIG. 1 having vertical takeoff and landing (VTOL) capability due to vertical slipstream deflection and even thrust reversal capability.

FIG. 3 is a fragmentary section view of an embodiment of the blown channel Circulation Control Wing (CCW) shown in FIG. 1 having vertical takeoff and landing (VTOL) capability because of near vertical thrust deflection. The blown channel CCW 10 of FIG. 3 is similar to the blown channel CCW 10 of FIG. 2 described above and therefore includes a channel 5, air supply plenums 21, 32, a trailing-edge slot 15, a rounded trailing edge 17, a leading-edge slot 34, an engine 9 and a propeller 7. Referring to FIG. 3, the pressure of the blowing air 19' can be changed by a control mechanism (not shown) such that pressurized air 19' can be discharged over the channel rounded trailing edge 17 to yield a jet turning angle of nearly 90°, near the vertical position. The propeller thrust 23' is entrained into the near vertical position of the pressurized air 19' and is deflected at an angle 22' approximately 85–95 degrees for lifting the aircraft weight by thrust 23'. By increasing blowing 19", the deflected thrust 23" can turn at an angle 22" approximately 165° and thus provide a thrust reversal 23" that is obtained independent of an aircraft angle of attack, thus preventing the asymmetry, separated flow, and stall experienced by the convention Channel Wing at the high angle of attack it required for high-lift generation.

In short, as shown in FIGS. 2 and 3, due to entrainment from the pressurized air 19 of the channel-trailing-edge slot 15, the propeller thrust 23 can be deflected pneumatically to thrust angles 22 from 0 to 165 degrees or more from the horizontal plane 14. The deflection of the propeller thrust in the channel 5 allows for SuperSTOL or Vertical Takeoff and Landing (VTOL) operation at low angle of attack.

Figure 4:
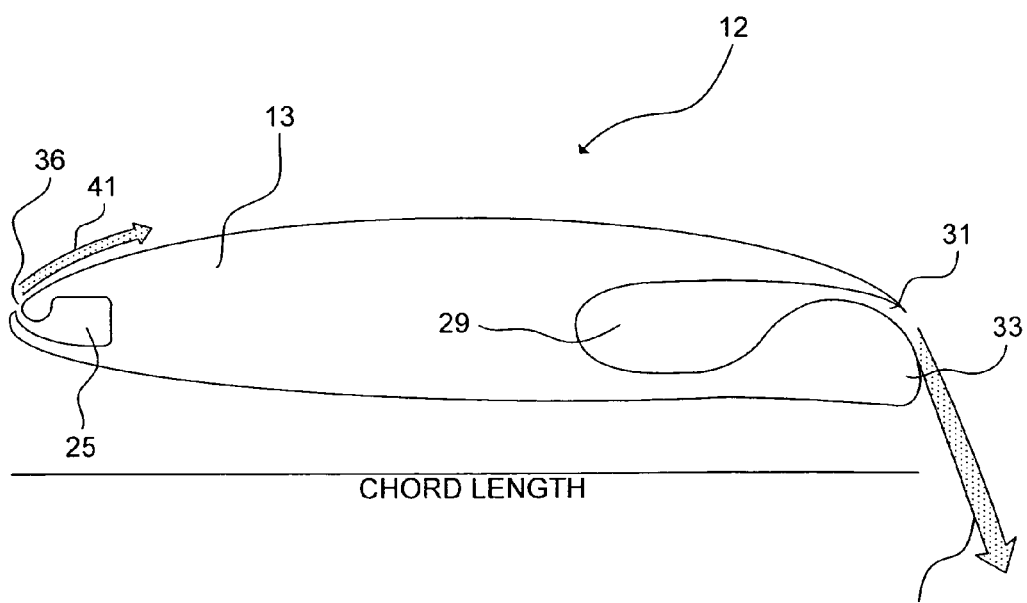
FIG. 4 is a cross section view of an embodiment of the blown outboard Circulation Control Wing shown in FIG. 1.

FIG. 4 is a cross section view of an embodiment of the blown outboard Circulation Control Wing (CCW) 12 shown in FIG. 1. The blown outboard CCW 12 includes an outboard wing 13, a trailing-edge slot 31 and a trailing edge 33 that is substantially rounded. The slot 31 and the edge 33 of the blown outboard CCW 12 can extend to the slot 15 and the edge 17, respectively, of the blown channel CCW 10. The discharging pressurized air 19, 43 of the trailing-edge slots 15, 31 from the blown channel CCW 10 and the blown outboard CCW 12 can be controlled independently and/or in combination. The outboard-trailing-edge slot 31 is adjacent and tangential along the rounded trailing edge 33 of the blown outboard CCW 12 similar to the placement of the trailing-edge slot 15 and the rounded trailing edge 17 of the blown channel CCW 10. The trailing-edge slot 31 of the blown outboard CCW 12 is capable of tangentially discharging pressurized air 43 over the rounded trailing edge 33 of the blown outboard CCW 12 to provide further augmented aerodynamic forces plus moments for trim and for stability & control. This provides additional control moments and higher lift, and the addition of higher drag to offset propeller thrust when needed to slow the aircraft when making Super STOL approaches down steep glide slopes.

The blown outboard CCW 12 further includes a leading-edge blowing slot 36 that is installed to prevent leading-edge separation on this high-lift wing, as well as to provide controllable pitching moment by differential front/rear slot blowing. The leading-edge slot 36 of the blown outboard CCW 12 can extend to the slot 34 of the blown channel CCW 10. The discharging pressurized air 30, 41 from the leading-edge slots 34, 36 from the blown channel CCW 10 and the blown outboard CCW 12 can be controlled independently and/or in combination. The leading-edge slots 34, 36 discharge pressurized air 30, 41 at the leading edge of both the channel 5 and the outboard wing 13 of the wing 3 such that the discharging pressurized air 30, 41 from the leading-edge slots 34, 36 create a suction at the leading edge, which thus provides a nose-up pitching moment to trim out a nose-down moment that is caused by the discharging pressurized air 19, 43 at the trailing edge of the CC wing.

It should be noted that the slots 15, 34, 31, 36 can be a continuously opening that extends tangentially along the leading and trailing edges. In an alternative embodiment, the slots 15, 34, 31, 36 can be multiple openings along the leading and trailing edges. In both embodiments, the slots can be varied such that the pressurized air can yield side forces and/or lateral and directional moment control, which is described in FIG. 6. It should also be noted that the aircraft can include differential blowing of a left blown outboard CCW and a right blown outboard CCW. The differential blowing is the blowing rate of the left blown outboard CCW that is different from the blowing rate of the right blown outboard CCW to yield aerodynamic moments.

Figure 5:
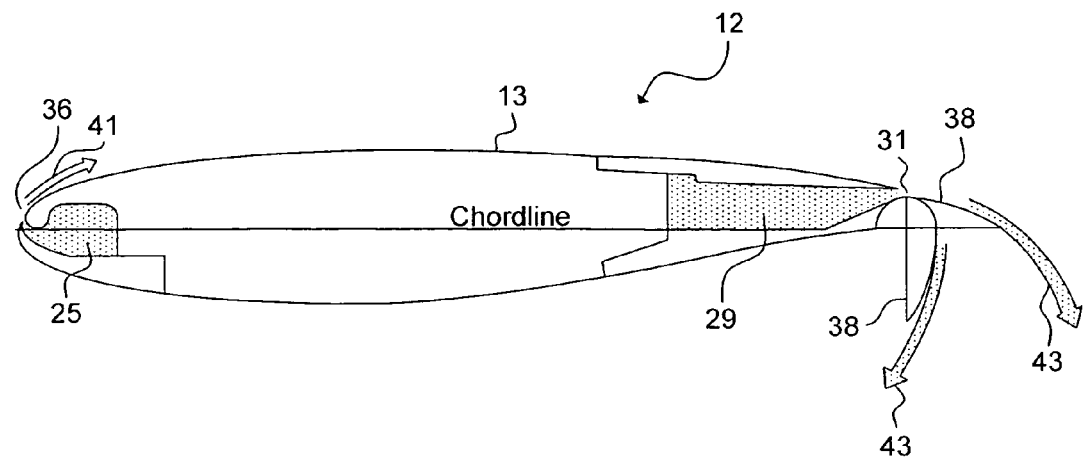
FIG. 5 is a cross section view of an alternative embodiment of the outboard channel Circulation Control Wing shown in FIGS. 1 and 4.

FIG. 5 is a cross section view of an alternative embodiment of the outboard channel Circulation Control Wing shown in FIG. 1. The blown outboard CCW 12 of FIG. 5 is similar to the blown outboard CCW 12 of FIG. 4 described above and therefore includes an outboard wing 13, a trailing-edge slot 31, a leading-edge slot 36, and air supply plenums 25, 29. The blown outboard CCW 12 shown in FIG. 5 further includes a small dual-radius blown CCW flap 38, which mechanical rotates from a horizontal position to a vertical position, and vice versa. This dual-radius flap 38 provides jet turning and also adds the capability for greater drag to be generated should that be necessary for Super-STOL approach down steep glide slopes.

In an alternative embodiment, the aircraft includes a spanwise variation (not shown) in the blowing rate of the trailing-edge slot 31 on a section of the blown outboard CCW 12 to tailor a spanwise lift distribution, and thus minimize the induced drag on the blown outboard CCW 12. This spanwise variation can be implemented by changing a height of the trailing-edge slot 31 or changing the rate of flow of the discharging pressurized air from the trailing-edge slot 31 at the section of the blown outboard CCW 12. The spanwise variation in slot height or flow rate or blowing momentum can also minimize drag generated from the propeller thrust over the channel 5 by distributing the discharging pressurized air across the channel 5. In an alternative embodiment, a spanwise variation in the blowing rate of the trailing edge is implemented on both the channel 5 and the blown outboard CCW 12 so that spanwise control of lift distribution and drag across the entire lifting wing 3 is achieved.

Figure 6:
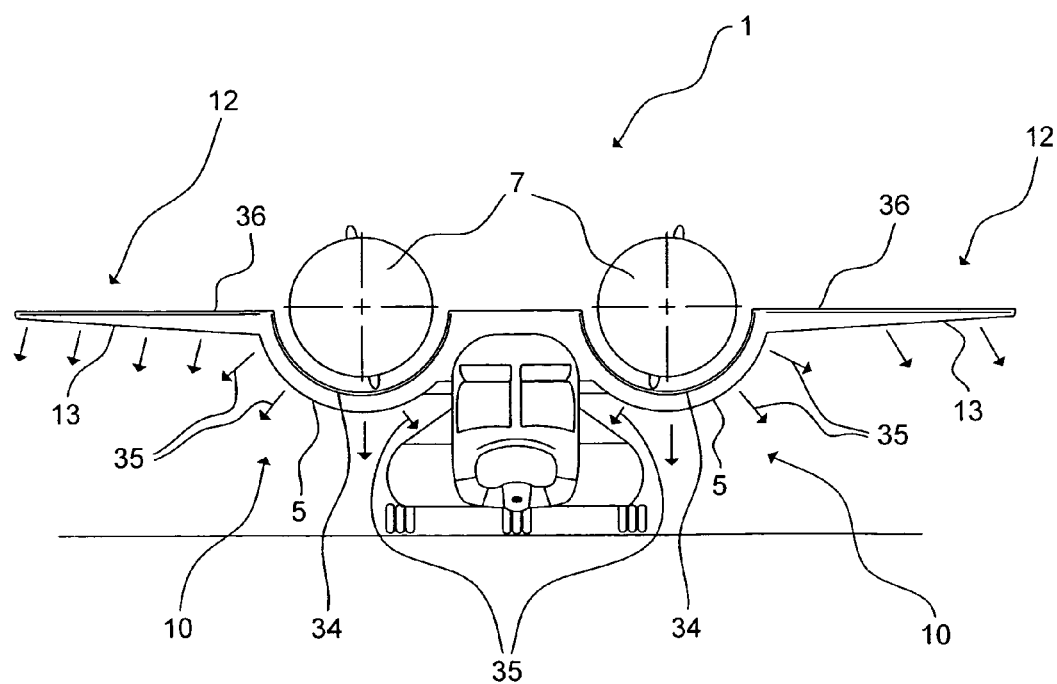
FIG. 6 is a front view of an embodiment of an aircraft shown in FIG. 1 showing pressurized air that is discharged from both the blown channel Circulation Control Wing and the blown outboard Circulation Control Wing.

FIG. 6 is a front view of an embodiment of the aircraft shown in FIG. 1 showing pressurized air that is discharged from both the blown channel CCW 10 and the blown outboard CCW 12. A control mechanism (not shown) can adjust either the discharging-pressurized-air rate or propeller thrust so that the lift and thrust deflection can be changed, and not by changing aircraft angle of attack, so that no moving surfaces are necessary to yield either high lift or thrust deflection. The control mechanism can selectively discharge pressurized air from a section of the trailing-edge slot 15 along the channel 5 to yield side forces 35 and/or lateral and directional moment control. For example, if the aircraft is desired to yaw right, the pressurized air from the trailing-edge slot on the right side sections of the channels 5 is discharged and no pressurized air from the trailing-edge slot (not shown) on the left side sections of the channels 5 is discharged. If the aircraft is desired to yaw left, the pressurized air from the trailing-edge slot on the left side sections of the channels 5 is discharged and no pressurized air from the trailing-edge slot 5 on the right side section of the channel 5 is discharged. The selective discharging of pressurized air from the section of the trailing-edge slot can produce augmented yawing, rolling, or pitching moments to control the aircraft even at very low flight speeds, and without any moving external control surfaces.

The control mechanism can differentially or selectively discharge pressurized air to vary the spanwise lift distribution and thus the induced drag on the total wing. The control mechanism can further control the rate of the discharging pressurized air from both the leading-edge slot 34 and trailing-edge slots 15, 31 to vary the lift, drag, thrust deflection and aerodynamic moments that can be made to occur very rapidly. Thus, a rapid response for flight control of the aircraft is possible because the aircraft does not depend on any moving external surfaces, but only on air pressure flow variation into the channel wing surfaces.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. An aircraft comprising:
   a channel wing having a blown channel circulation control wing (CCW), the blown channel CCW having a channel that has a substantially rounded trailing edge, the channel further having a trailing-edge slot that is adjacent to the substantially rounded trailing edge of the channel, the trailing-edge slot having an inlet connected to a source of pressurized air and the trailing-edge slot being capable of tangentially discharging pressurized air at a blowing rate over the substantially rounded trailing edge; and
   a propeller being located in the channel and being ahead of the substantially rounded trailing edge and aft of a leading edge of the blown channel CCW, the propeller providing a propeller thrust and increased inflow velocity in a near-circular flow stream across the channel wing,
   wherein the propeller thrust in the near-circular flow stream across the channel wing is deflected by the pressurized air being discharged over the substantially rounded trailing edge, which provides a high lift that is obtained independent of an aircraft angle of attack, thus preventing the asymmetry, separated flow, and stall typically experienced by an unblown channel wing at the high angle of attack it required for high lift generation.

2. The aircraft as defined in claim 1, wherein the pressurized air that is discharged from the trailing-edge slot over the rounded trailing edge remains attached to the channel rounded trailing edge of the channel by balancing reduced static pressure with centrifugal force, the pressurized air being capable of discharging at various blowing rates, the propeller thrust being capable of deflecting pneumatically, due to entrainment from the pressurized air of the trailing-edge slot of the channel, to thrust angles from 0° to 85° from the horizontal, thus providing high lift of much higher magnitude than just vectored thrust, thus allowing Super-STOL at low angle of attack, due to entrainment by the blown channel of the nearly round propeller exhaust stream.

3. The aircraft as defined in claim 2, wherein the propeller thrust is deflected pneumatically, due to entrainment from the pressurized air of the trailing-edge slot, to thrust angles of approximately 90 degrees from a horizontal plane, thus allowing Vertical Takeoff and Landing (VTOL) operation at low angle of attack.

4. The aircraft as defined in claim 2, wherein the blowing rate of the trailing-edge slot is increased to yield higher propeller thrust deflection up to 165° and thus the capability for in-flight thrust reversal.

5. The aircraft as defined in claim 1, wherein the wing further comprises a blown outboard Circulation Control Wing (CCW), wherein the trailing-edge slot and the rounded trailing edge extends to the outboard CCW, the trailing-edge slot of the outboard CCW being capable of tangentially discharging pressurized air over the rounded trailing edge, wherein the pressurized air of the trailing-edge slot provides aerodynamic lift, drag change, and moments for trim and for stability & control.

6. The aircraft as defined in claim 5, wherein the aircraft comprises a left blown outboard CCW and a right blown outboard CCW, the aircraft having differential blowing of the trailing-edge slots of the left and right blown outboard CCWs, wherein the differential blowing is the blowing rate of the left blown outboard CCWs being different from the blowing rate of the right blown outboard CCWs, wherein the differential blowing rate yields aerodynamic moments.

7. The aircraft as defined in claim 5, further comprising a spanwise variation in the blowing rate of the trailing-edge slot of the outboard CC wing to tailor a spanwise lift distribution, and thus minimize the induced drag on the outboard CC wing, without any moving surfaces.

8. The aircraft as defined in claim 5, further comprising a spanwise variation in the blowing rate of the trailing-edge slot of both the channel and the outboard CC wing so that spanwise control of lift distribution and drag across the entire lifting wing is achieved.

9. The aircraft as defined in claim 1, wherein either the discharging-pressurized-air rate or propeller thrust is adjustable so that the lift and thrust deflection can be changed, and not by changing aircraft angle of attack, so that no moving surfaces other than the propeller are necessary to yield either high lift or thrust deflection.

10. The aircraft as defined in claim 9, wherein the pressurized air from a section of the trailing-edge slot along the channel is selectively discharged to yield side forces or lateral and directional moment control, and/or pitching moment control.

11. The aircraft as defined in claim 10, wherein the pressurized air from the trailing-edge slot of the channel is differentially or partially discharged to vary the spanwise lift distribution and thus the induced drag.

12. The aircraft as defined in claim 1, wherein the channel wing further comprises a leading-edge slot that discharges pressurized air tangentially at a leading edge of the channel wing to control the leading-edge flow separation so as to facilitate eliminating leading-edge stall of the channel, flow asymmetry into the propeller and the resulting instability.

13. The aircraft as defined in claim 12, wherein the leading-edge slot extends from the channel to the outboard along to the leading edge of the channel wing so as to facilitate preventing leading-edge separation as well as generating lift.

14. The aircraft as defined in claim 12, wherein the leading-edge slot discharges pressurized air at the leading edge, wherein the discharging pressurized air from the leading-edge slot creates a suction at the leading edge and thus provides a nose-up pitching moment to trim out a nose-down moment that is caused by the discharging pressurized air at the trailing edge of the CC wing.

15. The aircraft as defined in claim 14, wherein the discharging pressurized air from both the leading-edge and trailing-edge slots varies the lift, drag, thrust deflection and aerodynamic moments that can be made to occur very rapidly, and thus yield rapid response for flight and control of the aircraft because the aircraft does not depend on any moving external surfaces, but only on air pressure flow variation into the CC wing surfaces.

16. The aircraft as defined in claims 4, wherein the propeller thrust can be varied so that the variation of propeller thrust plus the discharging rate of pressurized air of the trailing-edge slots can interchange thrust and drag as needed during takeoff and landing, without any moving parts other than the propeller.

17. The aircraft as defined in claim 1, wherein the location of the propeller in the channel between the aft trailing edge and the forward leading edge substantially eliminates perceived propeller noise on the ground and substantially eliminates the possibility of contact between passengers and the propellers when the aircraft is on the ground during loading or unloading.

18. The aircraft as defined in claims 1, wherein the aircraft is one of a combined, synergistic, integrated Pneumatic (blown) Channel Wing VSTOL and Super Short Takeoff and Landing (Super STOL) aircraft, varying all aerodynamic and powered-lift characteristics, forces and moments merely by varying blowing air pressure, blowing air flow and/or propeller thrust, without any other external moving parts, wherein the aircraft combines the unblown channel wing, the blown channel wing CCW, and the blown outboard CCW to give far greater lift and control then any of the individual wing elements and is controlled by blowing air without any moving parts other than the propeller in the channel.

* * * * *